(12) United States Patent
Liu et al.

(10) Patent No.: US 11,036,082 B2
(45) Date of Patent: Jun. 15, 2021

(54) COLOR HOMOGENIZING FILM FOR DISPLAYS WITH DIRECT-LIT BACKLIGHT UNITS

(71) Applicant: Apple Inc., Cupertino, CA (US)

(72) Inventors: Rong Liu, Sunnyvale, CA (US); Yu P. Sun, Yorba Linda, CA (US); Victor H. Yin, Cupertino, CA (US); Jun Qi, San Jose, CA (US); Ziruo Hong, Cupertino, CA (US)

(73) Assignee: Apple Inc., Cupertino, CA (US)

(*) Notice: Subject to any disclaimer, the term of this patent is extended or adjusted under 35 U.S.C. 154(b) by 67 days.

(21) Appl. No.: 16/422,730

(22) Filed: May 24, 2019

(65) Prior Publication Data

US 2020/0019019 A1    Jan. 16, 2020

Related U.S. Application Data

(60) Provisional application No. 62/697,279, filed on Jul. 12, 2018.

(51) Int. Cl.
| | |
|---|---|
| *G02F 1/13357* | (2006.01) |
| *G02F 1/1335* | (2006.01) |
| *G02F 1/1333* | (2006.01) |
| *F21V 8/00* | (2006.01) |

(52) U.S. Cl.
CPC ....... *G02F 1/133606* (2013.01); *G02B 6/002* (2013.01); *G02B 6/0058* (2013.01); *G02F 1/133388* (2021.01); *G02F 1/133603* (2013.01); *G02F 1/133609* (2013.01); *G02F 1/133611* (2013.01); *G02F 1/133614* (2021.01); *G02F 1/133607* (2021.01)

(58) Field of Classification Search
CPC ......... G02F 1/133604; G02F 1/133606; G02F 1/133607; G02F 1/133609; G02F 1/133611; G02F 1/133614; G02F 1/133388; G02B 6/002; G02B 6/005; G02B 6/0033; G02B 6/0035; G02B 6/0036; G02B 6/0038; G02B 6/0058; G02B 6/0061
See application file for complete search history.

(56) References Cited

U.S. PATENT DOCUMENTS

| | | |
|---|---|---|
| 7,511,784 B2 | 3/2009 | Ushiro et al. |
| 9,726,887 B2 | 8/2017 | Fleck et al. |

(Continued)

*Primary Examiner* — Jessica M Merlin
(74) *Attorney, Agent, or Firm* — Treyz Law Group, P.C.; Joseph F. Guihan

(57) ABSTRACT

A display may have a pixel array such as a liquid crystal pixel array. The pixel array may be illuminated with backlight illumination from a backlight unit. The backlight unit may include an array of light-emitting diodes and a light reflector that helps reflect light from the light-emitting diodes through the pixel array. A color conversion layer may be used to convert light from the light-emitting diodes from blue light to white light. A microlens array layer formed over the color conversion layer may spread the light from the color conversion layer to homogenize the light. To ensure light is emitted from the backlight with a uniform color, the microlens array layer may have different transmittance portions. A central portion of the microlens array layer may transmit more light and reflect less light than an edge portion of the microlens array layer.

19 Claims, 12 Drawing Sheets

(56) References Cited

U.S. PATENT DOCUMENTS

| | | | |
|---|---|---|---|
| 2005/0201109 A1* | 9/2005 | Shimura | F21V 5/045 362/382 |
| 2010/0188611 A1* | 7/2010 | Wang | G02F 1/133603 349/68 |
| 2011/0141718 A1* | 6/2011 | Weng | G02B 5/0215 362/97.1 |
| 2016/0070137 A1* | 3/2016 | You | G02F 1/133603 349/71 |
| 2016/0372636 A1 | 12/2016 | Hwang et al. | |
| 2018/0046031 A1 | 2/2018 | Kamada et al. | |
| 2018/0321557 A1* | 11/2018 | Pelka | G02F 1/133608 |

\* cited by examiner

COLOR HOMOGENIZING FILM FOR DISPLAYS WITH DIRECT-LIT BACKLIGHT UNITS

This case claims the benefit of provisional patent application No. 62/697,279, filed Jul. 12, 2018, which is hereby incorporated by reference herein in its entirety.

BACKGROUND

This relates generally to displays, and, more particularly, to backlit displays.

Electronic devices often include displays. For example, computers and cellular telephones are sometimes provided with backlit liquid crystal displays. Edge-lit backlight units have light-emitting diodes that emit light into an edge surface of a light guide plate. The light guide plate then distributes the emitted light laterally across the display to serve as backlight illumination. Direct-lit backlight units have arrays of light-emitting diodes that emit light vertically through the display.

Direct-lit backlights may have locally dimmable light-emitting diodes that allow dynamic range to be enhanced. If care is not taken, however, a direct-lit backlight may produce non-uniform backlight illumination.

SUMMARY

A display may have a pixel array such as a liquid crystal pixel array. The pixel array may be illuminated with backlight illumination from a backlight unit. The backlight unit may include an array of light-emitting diodes and a light reflector that helps reflect light from the light-emitting diodes through the pixel array. Each light-emitting diode may be placed in a respective cell. In each cell, the light reflector may have a cross-sectional profile that includes a parabolic or elliptical portion.

A diffuser in the display may be used to homogenize light from the array of light-emitting diodes. A color conversion layer may be used to convert light from the light-emitting diodes from blue light to white light. A microlens array layer formed over the color conversion layer may spread the light from the color conversion layer to further homogenize the light.

To ensure light is emitted from the backlight with a uniform color, the microlens array layer may have different transmittance portions. A central portion of the microlens array layer may transmit more light and reflect less light than an edge portion of the microlens array layer. There may be a gradual change in transmittance between the different transmittance portions. The central portion of the microlens array layer may have concave microlenses whereas the edge portion of the microlens array layer may have convex microlenses.

DETAILED DESCRIPTION

Figure 1:
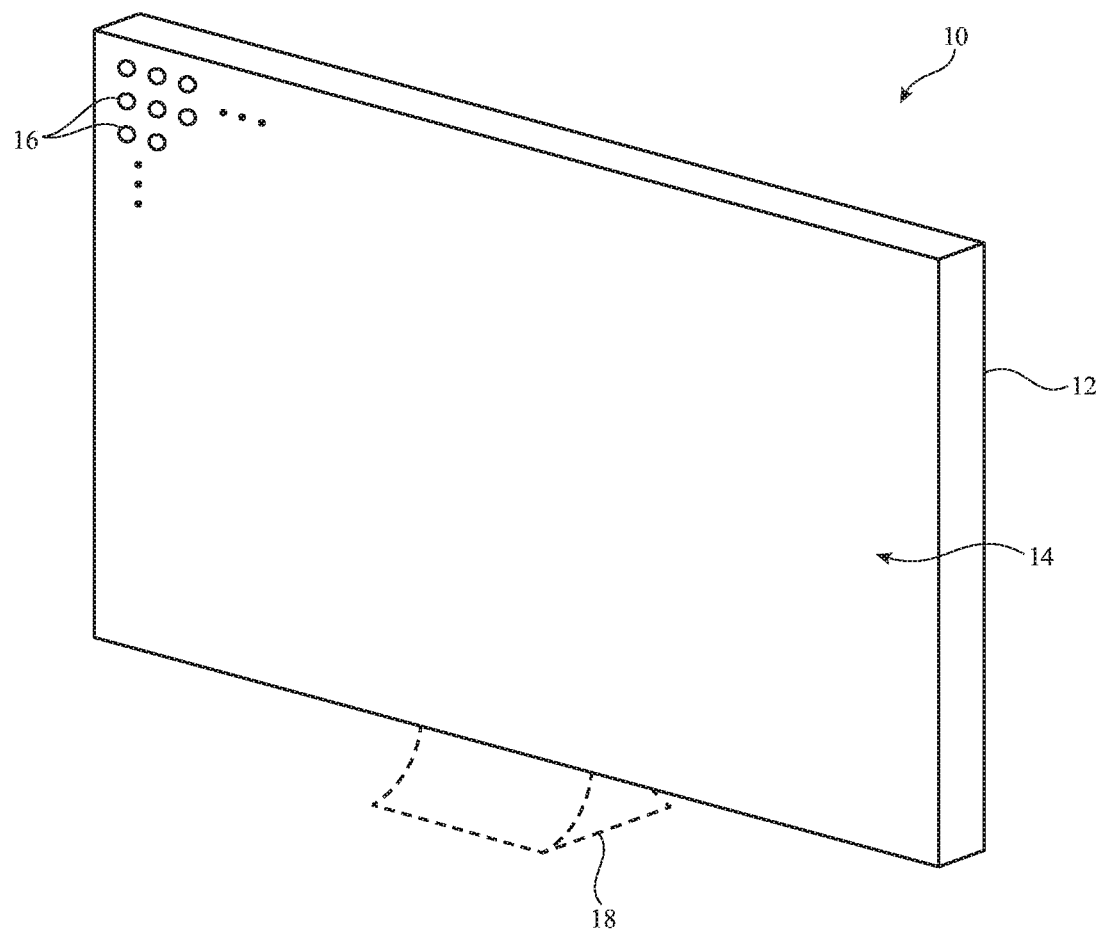
FIG. 1 is a diagram of an illustrative electronic device having a display in accordance with an embodiment.

Electronic devices may be provided with backlit displays. The backlit displays may include liquid crystal pixel arrays or other display structures that are backlit by light from a direct-lit backlight unit. A perspective view of an illustrative electronic device of the type that may be provided with a display having a direct-lit backlight unit is shown in FIG. 1. Electronic device 10 of FIG. 1 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, device 10 may have a display such as display 14. Display 14 may be mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Housing 12 may have a stand such as optional stand 18, may have multiple parts (e.g., housing portions that move relative to each other to form a laptop computer or other device with movable parts), may have the shape of a cellular telephone or tablet computer (e.g., in arrangements in which stand 18 is omitted), and/or may have other suitable configurations. The arrangement for housing 12 that is shown in FIG. 1 is illustrative.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels 16 formed from liquid crystal display (LCD) components or may have an array of pixels based on other display technologies. A cross-sectional side view of display 14 is shown in FIG. 2.

Figure 2:
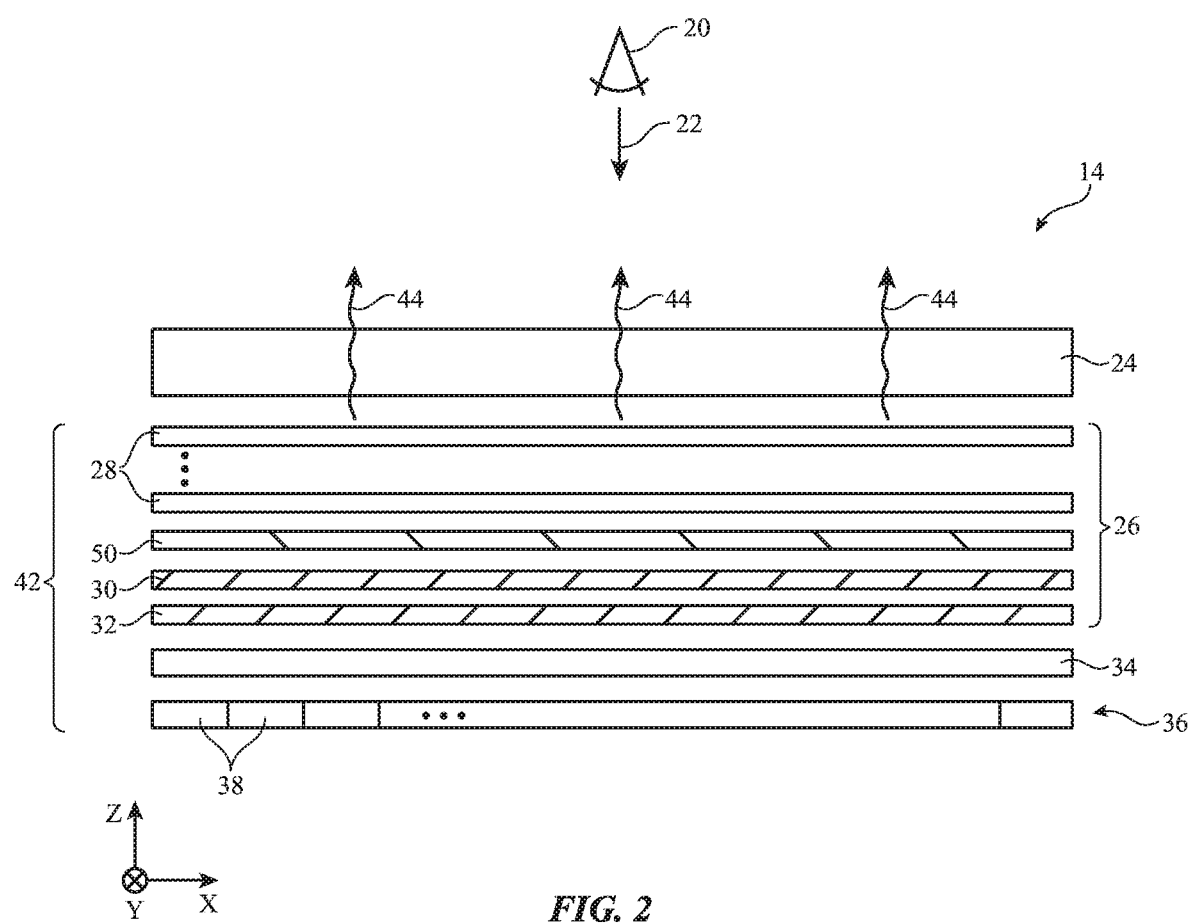
FIG. 2 is a cross-sectional side view of an illustrative display in accordance with an embodiment.

As shown in FIG. 2, display 14 may include a pixel array such as pixel array 24. Pixel array 24 may include an array of pixels such as pixels 16 of FIG. 1 (e.g., an array of pixels having rows and columns of pixels 16). Pixel array 24 may be formed from a liquid crystal display module (sometimes referred to as a liquid crystal display or liquid crystal layers) or other suitable pixel array structures. A liquid crystal display for forming pixel array 24 may, as an example, include upper and lower polarizers, a color filter layer and a thin-film transistor layer interposed between the upper and lower polarizers, and a layer of liquid crystal material interposed between the color filter layer and the thin-film transistor layer. Liquid crystal display structures of other types may be used in forming pixel array 24, if desired.

During operation of 14, images may be displayed on pixel array 24. Backlight unit 42 (which may sometimes be referred to as a backlight, backlight layers, backlight structures, a backlight module, a backlight system, etc.) may be used in producing backlight illumination 44 that passes through pixel array 24. This illuminates any images on pixel array 24 for viewing by a viewer such as viewer 20 who is viewing display 14 in direction 22.

Backlight unit 42 may have optical films 26, a light diffuser such as light diffuser (light diffuser layer) 34, and light-emitting diode array 36. Light-emitting diode array 36 may contain a two-dimensional array of light sources such as light-emitting diodes 38 that produce backlight illumination 44. Light-emitting diodes 38 may, as an example, be arranged in rows and columns and may lie in the X-Y plane of FIG. 2.

Light-emitting diodes 38 may be controlled in unison by control circuitry in device 10 or may be individually controlled (e.g., to implement a local dimming scheme that helps improve the dynamic range of images displayed on pixel array 24). The light produced by each light-emitting diode 38 may travel upwardly along dimension Z through light diffuser 34 and optical films 26 before passing through pixel array 24. Light diffuser 34 may contain light-scattering structures that diffuse the light from light-emitting diode array 36 and thereby help provide uniform backlight illumination 44. Optical films 26 may include films such as dichroic filter 32, phosphor layer 30, microlens array layer 50, and films 28. Films 28 may include brightness enhancement films that help to collimate light 44 and thereby enhance the brightness of display 14 for user 20 and/or other optical films (e.g., compensation films, etc.).

Light-emitting diodes 38 may emit light of any suitable color. With one illustrative configuration, light-emitting diodes 38 emit blue light. Dichroic filter layer 32 may be configured to pass blue light from light-emitting diodes 38 while reflecting light at other colors. Blue light from light-emitting diodes 38 may be converted into white light by a photoluminescent material such as phosphor layer 30 (e.g., a layer of white phosphor material or other photoluminescent material that converts blue light into white light). If desired, other photoluminescent materials may be used to convert blue light to light of different colors (e.g., red light, green light, white light, etc.). For example, one layer 30 (which may sometimes be referred to as a photoluminescent layer or color conversion layer) may include quantum dots that convert blue light into red and green light (e.g., to produce white backlight illumination that includes, red, green, and blue components, etc.). Configurations in which light-emitting diodes 38 emit white light (e.g., so that layer 30 may be omitted, if desired) may also be used.

In configurations in which layer 30 emits white light such as white light produced by phosphorescent material in layer 30, white light that is emitted from layer 30 in the downwards (–Z) direction may be reflected back up through pixel array 24 as backlight illumination by dichroic filter layer 32 (i.e., layer 32 may help reflect backlight outwardly away from array 36). In configurations in which layer 30 includes, for example, red and green quantum dots, dichroic filter 32 may be configured to reflect red and green light from the red and green quantum dots, respectively to help reflect backlight outwardly away from array 36. By placing the photoluminescent material of backlight 42 (e.g., the material of layer 30) above diffuser layer 34, light-emitting diodes 38 may be configured to emit more light towards the edges of the light-emitting diode cells (tiles) of array 36 than at the centers of these cells, thereby helping enhance backlight illumination uniformity.

After passing through phosphor layer 30, light 44 passes through microlens array layer 50. Microlens array layer 50 may include features (e.g., convex or concave lenses) that spread and homogenize light 44. The microlens array layer may also recycle some of light 44. For example, a first portion of light is transmitted through microlens array layer 50 to optical films 28 whereas a second portion of light is reflected back towards phosphor layer 30.

Figure 3:
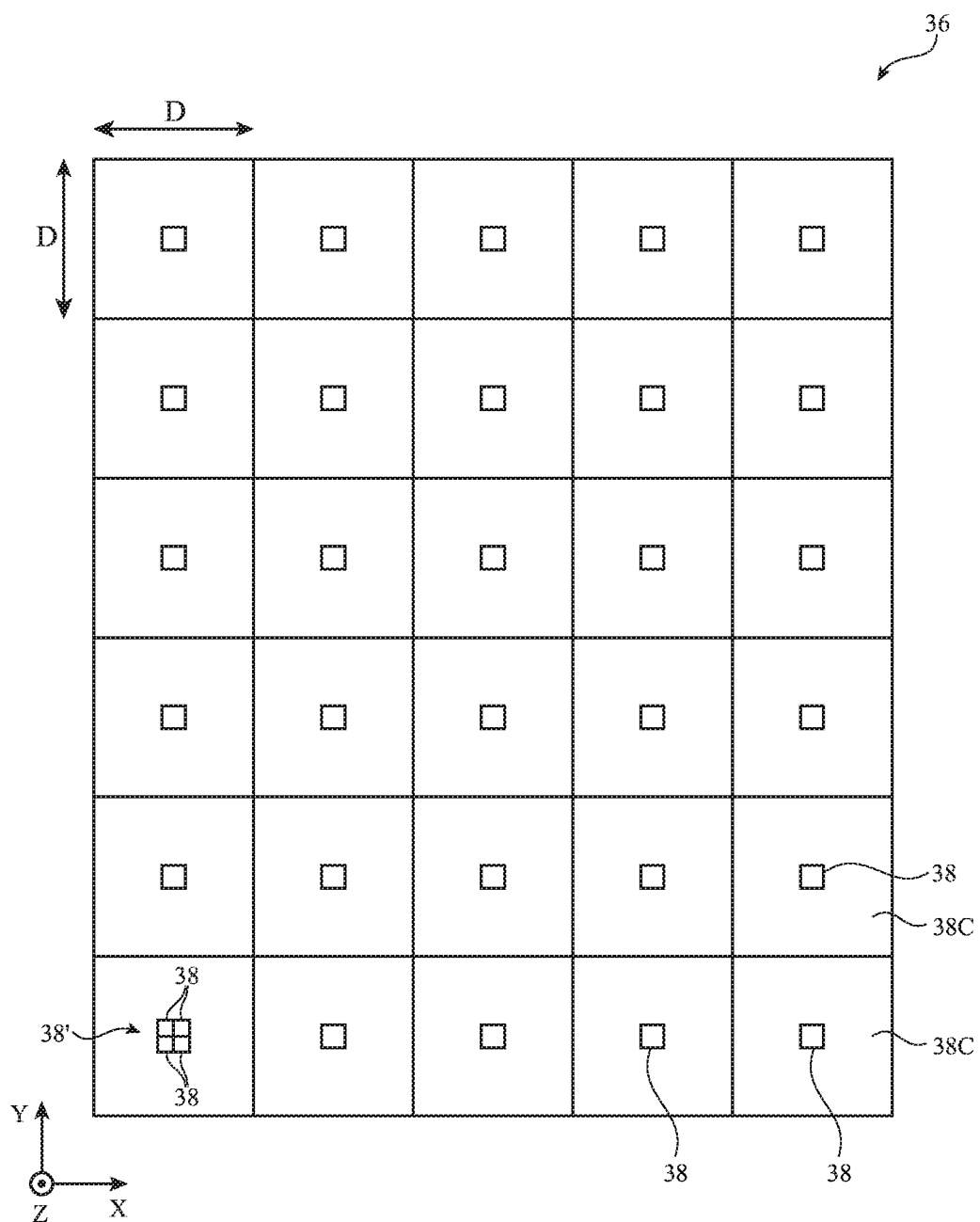
FIG. 3 is a top view of an illustrative light-emitting diode array for a direct-lit backlight unit in accordance with an embodiment.

FIG. 3 is a top view of an illustrative light-emitting diode array for backlight 42. As shown in FIG. 3, light-emitting diode array 36 may contain row and columns of light-emitting diodes 38. Each light-emitting diode 38 may be associated with a respective cell (tile area) 38C. The length D of the edges of cells 38C may be 2 mm, 18 mm, 1-10 mm, 1-4 mm, 10-30 mm, more than 5 mm, more than 10 mm, more than 15 mm, more than 20 mm, less than 25 mm, less than 20 mm, less than 15 mm, less than 10 mm, or other suitable size. If desired, hexagonally tiled arrays and arrays with light-emitting diodes 38 that are organized in other suitable array patterns may be used. In arrays with rectangular cells, each cell may have sides of equal length (e.g., each cell may have a square outline in which four equal-length cell edges surround a respective light-emitting diode) or each cells may have sides of different lengths (e.g., a non-square rectangular shape). The configuration of FIG. 3 in which light-emitting diode array 36 has rows and columns of square light-emitting diode regions such as cells 38C is merely illustrative.

If desired, each cell 38C may have a light source that is formed from an array of light-emitting diode dies (e.g., multiple individual light-emitting diodes 38 arranged in an array such as a 2×2 cluster of light-emitting diodes at the center of each cell 38C). For example, light source 38' in the leftmost and lowermost cell 38C of FIG. 3 has been formed from a 2×2 array of light-emitting diodes 38 (e.g., four separate light-emitting diode dies). The diodes 38 in light source 38' may be mounted on a common package substrate, may be mounted on a printed circuit board substrate that extends across array 36, or may be mounted in array 36 using other suitable arrangements. In general, each cell 38C may include a light source 38' with a single light-emitting diode 38, a pair of light-emitting diodes 38, 2-10 light-emitting diodes 38, at least two light-emitting diodes 38, at least 4 light-emitting diodes 38, at least eight light-emitting diodes 38, fewer than five light-emitting diodes 38, or other suitable number of light-emitting diodes. Illustrative configurations in which each cell 38C has a single light-emitting diode 38 may sometimes be described herein as an example. This is, however, merely illustrative. Each cell 38C may have a light source 38 with any suitable number of one or more light-emitting diodes 38.

Figure 4:
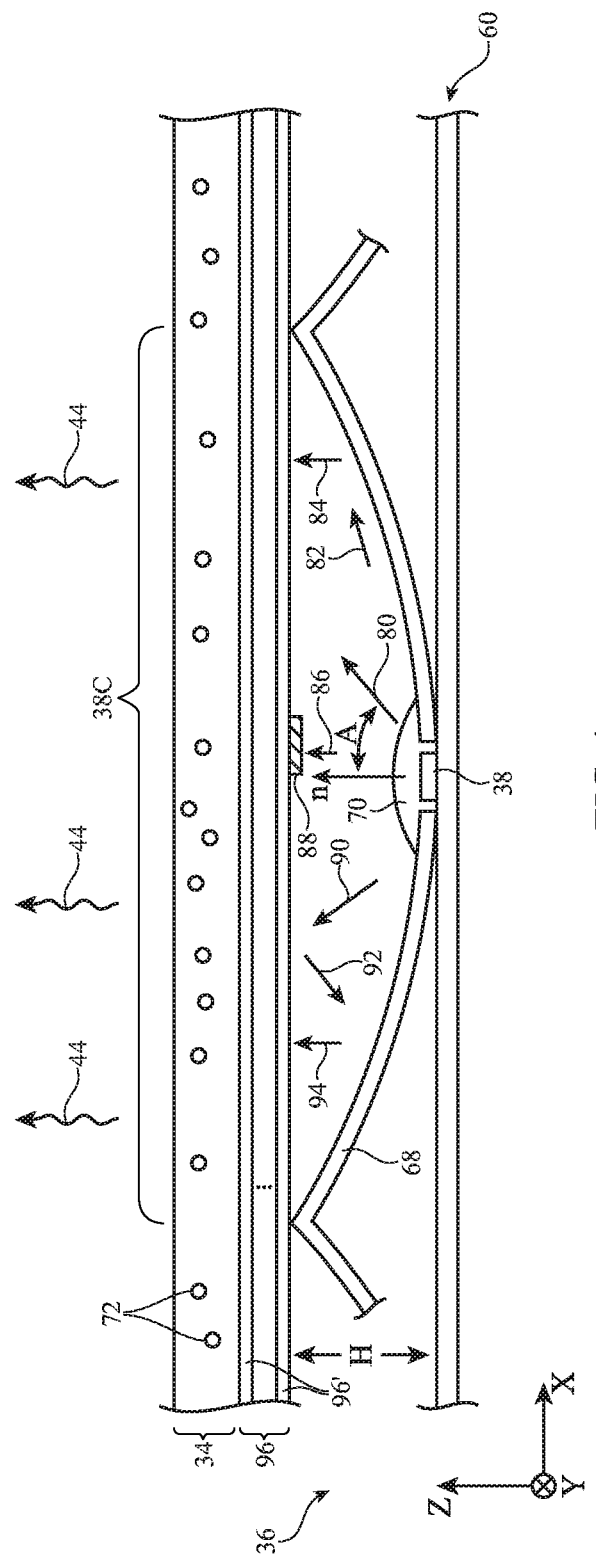
FIG. 4 is a cross-sectional side view of an illustrative light-emitting diode in a cavity reflector showing how light may be emitted from the light-emitting diode at various angles in accordance with an embodiment.

FIG. 4 is a cross-sectional side view of an illustrative light-emitting diode cell. As shown in FIG. 4, each light-emitting diode cell (tile) 38C in light-emitting diode array 36 may have a reflector such as cavity reflector 68. Reflector 68 may have a square outline (i.e., a square footprint when viewed from above) or may have other suitable shapes and may be formed from sheet metal (e.g., stamped sheet metal), metallized polymer film, a thin-film metal on a plastic carrier, a dielectric thin-film stack that forms a dielectric mirror (a thin-film interference mirror) on a polymer film or molded plastic carrier, a white reflective film (e.g., a glossy white polymer sheet formed from a white ink layer or other white layer on a polymer carrier covered with a glossy coating such as a glossy polymer coating, a diffusively reflective white reflector, or a specularly reflective white reflector), or other desired reflector structure. If desired, reflector 68 may be formed from a layer of cholesteric liquid crystals where Bragg reflectivity is controlled by material birefringence (refractive index difference) and pitch and can be singular or chirped for bandwidth control or may be an interference filter using a stack of layers with a sufficiently large index of refraction difference (e.g., n>0.1) between adjacent layers such as a stack of multiple polymer layers or layers of other materials. The stack of polymer layers may be, for example, a stack of alternating films of polyethylene terephthalate (PET) and polymethyl methacrylate (PMMA) or a stack of alternating films of polyethylene naphthalate (PEN) and PMMA. Light-emitting diode 38 may be soldered or otherwise mounted to metal traces in printed circuit 60. An opening in the center of reflector 68 may receive light-emitting diode 38. Cells in reflector 68 may have cross-sectional profiles with curved portions to help reflect light from diode 38 upwards as backlight illumination 44. With one illustrative configuration, a polymer film (e.g., a film coated with a dielectric thin-film interference mirror surface or a glossy white reflective surface) may be embossed using a roller (e.g., the film may be thermoformed using patterned structures on a heated roller). Following thermoforming operations to form the curved walls of reflector 68 in each cell 38C, a die cutting tool or other cutting apparatus may cut openings for each of light-emitting diodes 38.

As shown in FIG. 4, a transparent structure such as transparent dome structure 70 may be formed over light-emitting diode 38 to help laterally distribute light from light-emitting diode 38. Dome structure 70 may be formed from a bead of clear silicone or other transparent polymer (as an example). During operation, light-emitting diode 38 emits light that is refracted away from the Z axis by dome structure 70. Emitted light rays from light-emitting diode 38 such as ray 80, may be characterized by an angle A with respect to surface normal n of light-emitting diode 38. Light 80 that is traveling parallel to the Z dimension is parallel to surface normal n (angle A=0°). Light 80 that is traveling parallel to the X-Y plane is traveling perpendicular to the Z dimension and surface normal n (i.e., A=90°). Light 80 that is traveling at other angular orientations relative to surface normal n is characterized by an intermediate value of angle A.

Some rays of light 80 are oriented at relatively large angles A and are reflected upwardly in direction Z from reflector 68 (see, e.g., light ray 82 that reflects from reflector 68 as reflected light ray 84). Other rays of light 80 are oriented at smaller angles A. For example, light ray 90 is oriented at a smaller value of angle A with respect to surface normal n. An angularly dependent filter or other layer that is at least partially reflective such as layer 96 may be interposed between light diffuser 34 and light-emitting diodes 38 (and reflector 68) to help reflect at least some of vertical light rays (A=0°) or nearly vertical light rays at the center of cell 38C such as light ray 86 downwards while allowing more angled light rays (light rays that strike filter 96 at locations closer to the edges of cavity 38C) to pass to diffuser 34. For example, light rays such as light ray 90 may be reflected outwardly and downwardly (in the −Z direction) by layer 96 as shown by light ray 92 before being reflected back in the upwards (+Z) direction as shown by light ray 94.

Layer 96 may be formed from multiple dielectric layers 96' (e.g., layer 96 may be a thin-film interference filter formed from a dielectric stack with alternating high and low index-of-refraction materials formed from silicon oxide, silicon nitride, and/or other inorganic materials, layers of organic materials, and/or may be a layer formed from other dielectric materials and/or layers for forming a thin-film interference filter). With one illustrative configuration, there are 5 layers 96', 3-6 layers 96', more than 3 layers 96', or fewer than 10 layers 96' in layer 96 (as examples). Configurations in which layer 96 is formed from one or more layers of reflective material (e.g., a single layer of bulk material or two or more layers of material, etc.) without forming a thin-film interference filter or in which layer 96 includes both one or more bulk coating layers and a thin-film interference filter formed from a stack of dielectric layers may also be used. If desired, partially reflective layer 96 may be formed from a layer of cholesteric liquid crystals where Bragg reflectivity is controlled by material birefringence (refractive index difference) and pitch and can be singular or chirped for bandwidth control or may be a bandpass interference filter using a stack of layers with a sufficiently large index of refraction difference (e.g., n>0.1) between adjacent layers such as a stack of multiple polymer layers or layers of other materials. The stack of polymer layers may be, for example, a stack of alternating films of polyethylene terephthalate (PET) and polymethyl methacrylate (PMMA) or a stack of alternating films of polyethylene naphthalate (PEN) and PMMA.

To help ensure that backlight 44 is uniform, light diffuser 34 and/or other structures in backlight 42 may be provided with optional light homogenizing structures. For example, a pattern of light blocking and reflecting structures such as structures 88 may be formed on the lower surface of layer 96. Structures 88 may include dots, rings, square pads, pseudorandom patterns of pads that reflect and block light, or other structures that are patterned to block more emitted light in the center of cell 38C than at the edges of cell 38C. Structures 88 may be formed from patterned ink, patterns of reflecting protrusions, a patterned angularly-dependent thin-film interference filter layer, and/or other light reflecting and light scattering structures that help reflect and/or absorb on-axis emitted light at the center of cells 38C while allowing light at the edges of cells 38C to be passed upwardly towards films 26. This helps reduce hotspots in the middle of cells 38C and smooths out light intensity variations that might otherwise arise as light from array 36 is diffused by light diffuser 34. Structures 88 may be formed on the lower (inner) surface of layer 96, may be formed on a separate substrate (e.g., a substrate that is also used to carry layer 96 and/or a substrate that is different from the substrate supporting layer 96), or may be formed at other suitable locations within backlight unit 42.

During operation, at least some of the light from light-emitting diode 38 that is emitted directly upwards in the center of cell 38C (e.g., light 86 of FIG. 4) will be reflected downwards by optional structure 88 and/or by layer 96. Reflected light will be spread out laterally (e.g., by reflecting from cavity reflector 68). Other light, such as light 82 that is emitted from light-emitting diode 38 sideways, may reflect off of cavity reflector 68 without reflecting off of structure 88 or layer 96 and will pass upwards through diffuser 34 to serve as backlight 44. Light 90 will reflect from layer 96 and reflector 68 before passing upwards as light 94.

By recycling light near the center of each cell 38C while allowing light near the edges of each cell 38C to pass directly through diffuser 34, the intensity of light near the edges of each cell 38C may be increased relative to the intensity of light near the center of each cell 38C. This helps ensure that backlight 44 will be uniform across the surface of light diffuser 34 and backlight 42. If desired, light-scattering particles 72 (e.g., microbeads, hollow microspheres, bubbles, and/or other light-scattering particles) may be embedded within a polymer or other material that forms diffuser layer 34 to help diffuse emitted light. Light-scattering particles 72 may have an index of refraction that differs from that of the polymer that makes up diffuser 34. For example, the refractive index of particles 72 may be larger than the refractive index of the polymer or other material that is used in forming layer 34 or may be lower than the refractive index of diffuser 34. Light-scattering features (e.g., bumps, ridges, and/or other protrusions, grooves, pits, or other depressions may be formed on the upper and/or lower surface of light diffuser 34 in addition to or instead of including light-scattering particles 72 in diffuser 34. In some configurations, light may be diffused using a photoluminescent layer in backlight unit 42 (e.g., photoluminescent layer 30, which may be formed from phosphors and/or quantum dots) in addition to or instead of diffuser 34.

In the illustrative configuration of FIG. 4, a single structure 88 (e.g., a single pad) has been provided above the light-emitting diode 38 in each cell 38C. If desired, a cluster of pads (circular pads, square pads, or pads of other shapes) may be formed above each light-emitting diode. The density of the pads in each cluster (e.g., the number of pads per unit area and/or the area consumed by the pads per unit area) may be varied as a function of position. For example, each pad cluster may have more pads and/or larger pads near the center of that pad cluster than near the edges of that pad cluster. The use of graded structures such as pad clusters with graded pad densities (e.g., pads concentrated over diodes 38) may help smoothly reduce hotspots in cells 38C. If desired, structures 88 may be omitted (e.g., in configurations in which layer 96, lens 70, and/or other structures in backlight unit 42 are configured to homogenize emitted light without structures 88).

In the illustrative configuration of FIG. 4, a partially reflective layer (e.g., a thin metal layer, a stack of dielectric thin-film layers, one or more other partially reflective layers, etc.) such as layer 96 is provided between light diffuser 34 and light-emitting diodes 38. Layer 96 may be formed as a coating on the lower surface of diffuser 34, may be embedded in diffuser 34, and/or may be separate from diffuser 34. Light that is reflected downwardly from layer 96 may be reflected back in the upwards direction by cavity reflector 68. The presence of layer 96 thereby helps to enhance the number or reflections for each light ray and therefore enhances the homogenization of emitted light from light-emitting diode array 36 before this light passes through layer 34. If desired, additional diffusion may be provided by a diffusive coating on diffuser 34 and/or other layers in backlight unit 42 (e.g., a diffusive coating may be formed from a polymer layer on the upper surface of diffuser 34 with embedded light-scattering particles 72). The density of light-scattering particles 72 may, if desired, be graded.

As previously discussed, after passing through diffusion layer 34, light 44 may pass through phosphor layer 30 and microlens array layer 50. Microlens array layer 50 may recycle some of light 44. For example, a first portion of light is transmitted through microlens array layer 50 to optical films 28 whereas a second portion of light is reflected back towards phosphor layer 30. The recycled light tends to become less blue and more yellow with each pass through the phosphor layer (because more of the blue light is converted to red and green light, for example).

Figure 5:
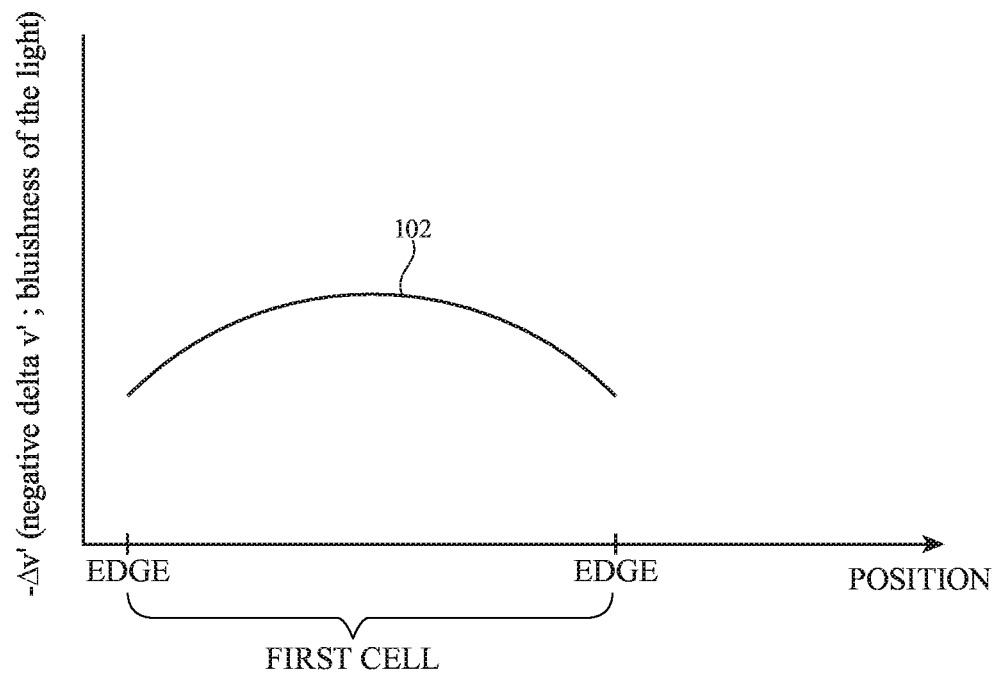
FIG. 5 is a graph illustrating the color variation from a light-emitting diode cell in $-\Delta v'$ (negative delta v') quantifying the bluishness of the light across the width of the light-emitting diode cell in accordance with an embodiment.

The light from the edge of a cell 38C tends to have been recycled from the upper film stack (e.g., optical films 28) more than light emitted from the center of the cell. Therefore, light from the edge of the cell may be less blue than light from the middle of the cell. FIG. 5 is a graph illustrating this effect. As shown by curve 102 in FIG. 5, light from the center of cell is bluer than light from the edges of the cell.

Figure 6:
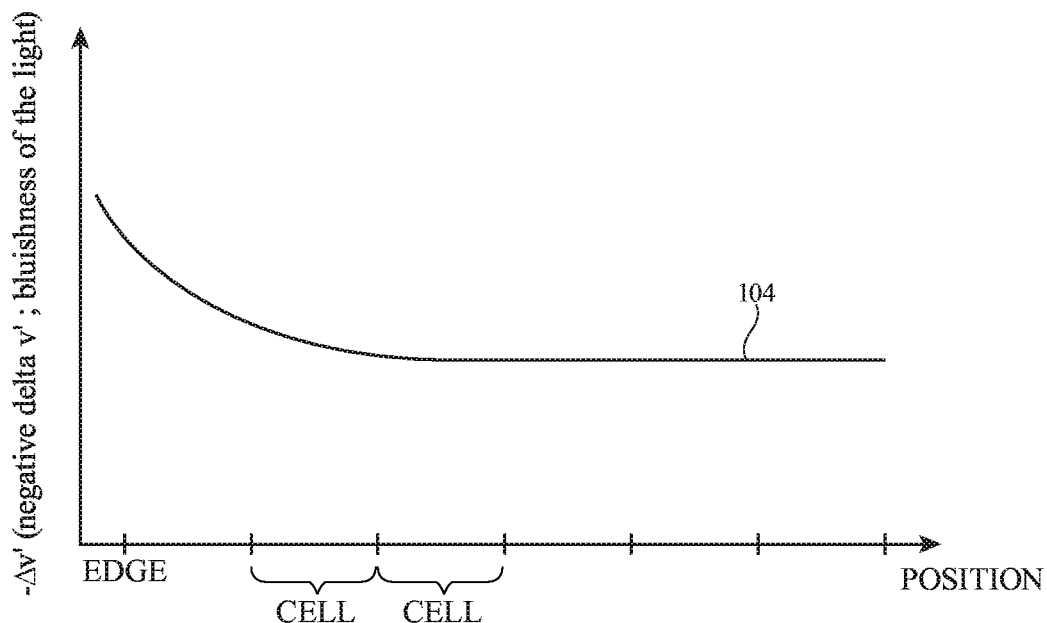
FIG. 6 is a graph illustrating how $-\Delta v'$ (negative delta v'), quantifying the bluishness of the light from a display, may vary across the width of the display in accordance with an embodiment.
Figure 7:
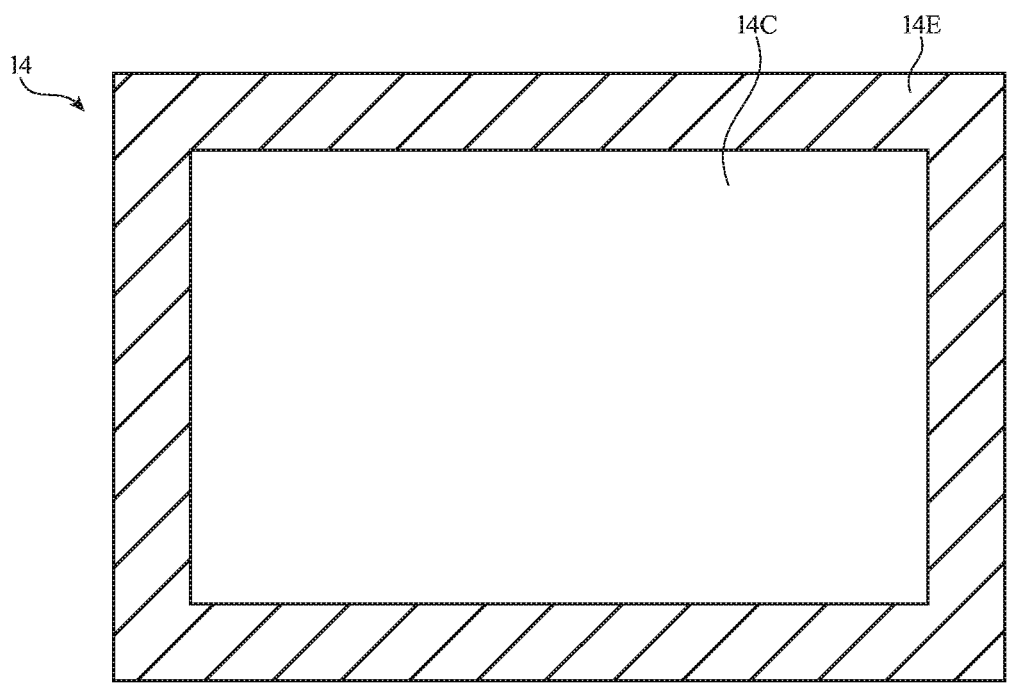
FIG. 7 is a top view of an illustrative display with more blue light emitted in the edges of the display in accordance with an embodiment.

Within the display (e.g., the middle of the display), light from a given cell is mixed with light from neighboring cells to produce display light of a uniform color (with a particular amount of blue light). However, at the edges of the display, there may be a shortage of yellow light (because at an edge, yellow light from a neighboring cell is absent at the border). This makes light from the edge of the display bluer than light from the middle of the display. This effect is shown in the graph of FIG. 6. As shown by curve 104, light from the edge of the display is bluer than light from the middle of the display. Each mark along the X-axis indicates the border of a respective cell 38C. As shown, light exiting from the two cells closest to the edge of the display is bluer than the remaining cells in the display. This example is merely illustrative, and light exiting from any desired number of cells may be bluer than the remaining cells in the display depending on the specific display design. The curve shown in FIG. 6 is merely illustrative and may have a different shape if desired. FIG. 7 is a top view of an illustrative display showing how the light exiting from an edge region 14E may be bluer than light exiting from a central portion 14C of the display. The blue edge region 14E may extend around the periphery of the display. To mitigate the color non-uniformity of the emitted light from the display, microlens array layer 50 may be provided with a portion along the edge of the display that recycles more light than a central portion.

Figure 8:
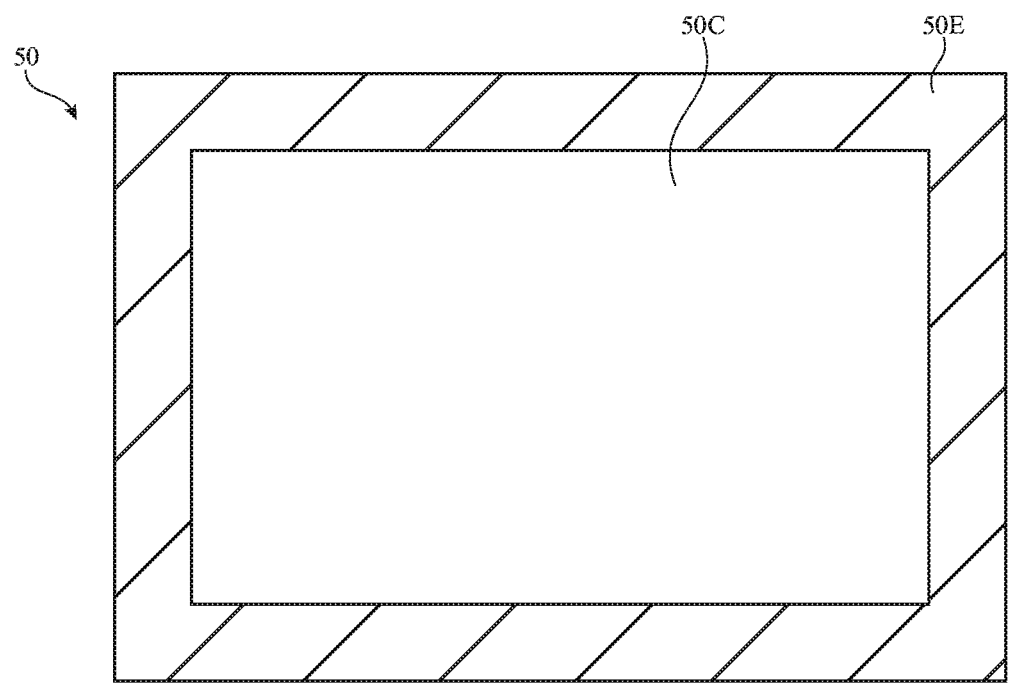
FIG. 8 is a top view of an illustrative microlens array with an edge portion having a lower transmittance than a central portion in accordance with an embodiment.

An illustrative microlens array layer with portions that transmit different amounts of light is shown in FIG. 8. Microlens array layer 50 may have a first portion (e.g., edge portion 50E) that transmits a first percentage of light (e.g., has a first transmittance) and a second portion (e.g., central portion 50C) that transmits a second percentage of light (e.g., has a second transmittance) that is different than the first percentage. As previously mentioned, the light recycled by the microlens array layer may become more yellow and less blue (due to more light being converted by phosphor layer 30). Therefore, to remove the bluish edge from the emitted light shown in FIG. 7, the microlens array layer may recycle more light in edge region 50E. In other words, the transmittance in edge region 50E may be lower than the transmittance in central region 50E (and therefore, the reflectance in edge region 50E may be higher than the reflectance in central region 50C). By transmitting less light and recycling more light, edge region 50E may shift the emitted light to a more yellow color, thus compensating for the blue edge effect shown in FIG. 7.

In some embodiments, there may be a defined boundary between the different regions of microlens array layer 50 with different transmission and reflectivity percentages (e.g., a step function defines the transmittance and reflectance across the microlens array layer). Alternatively, the transmission and reflectivity percentages may gradually change between the different regions of the microlens array layer. Having a transmittance gradient between the regions may ensure that light is emitted uniformly (without a noticeable border between transmittance regions). The transmittance profile of the microlens array can mirror the $-\Delta v'$ color profile of the light emitted across the display if the microlens array were to have a uniform transmittance.

Figure 9:
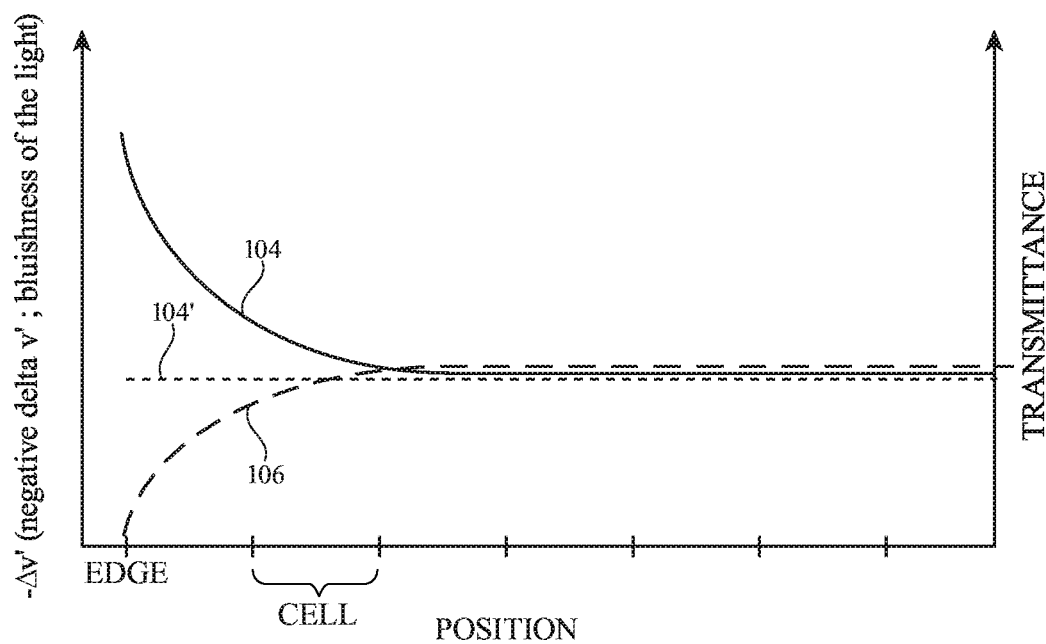
FIG. 9 is a graph illustrating how the transmittance of the microlens array may follow a curved profile to provide output light of a uniform color in accordance with an embodiment.

FIG. 9 is a graph showing color difference, specifically $-\Delta v'$ (negative delta v'), as a function of position within the display as well as the transmittance of the microlens array layer as a function of position within the display. Curve 104 (sometimes referred to as color profile 104) shows color difference (negative delta v') across the display as a function of position within the display in an embodiment where the microlens array has a uniform transmission percentage (as shown in FIG. 6). At the edge of the display the light emitted from the display is bluer than light emitted in the middle of the display. Each mark along the X-axis indicates the border of a respective cell 38C. As shown, light from the two cells closest to the edge of the display is bluer than the remaining cells in the display. To homogenize the color of the light from the display, the transmittance of the microlens array layer may vary. Curve 106 (sometimes referred to as transmittance profile 106) shows the transmittance of the microlens array layer as a function of position within the display. As shown, curve 106 is a mirror image of curve 104 (e.g., curves 104 and 106 are symmetrical). Curve 106 may be the inverse or opposite of curve 104. Profile 104' shows the $-\Delta v'$ profile of the light from the display as a function of position within the display in an embodiment where the microlens array layer has transmittance profile 106. By having curve 106 match the shape of curve 104, the color profile of light exiting from the microlens array will be uniform, as shown by profile 104'. For example, curves 104 and 106 may both be exponential curves (e.g., exponential functions such as an exponential growth curve or exponential decay curve). The microlens array layer may not absorb any light (meaning reflectance=1−transmittance). A profile of the reflectance of the microlens array layer as a function of position within the display may have the same shape as curve 104. The shapes of the profiles shown in FIG. 9 are merely illustrative, and the profiles may have other shapes if desired.

Figure 10:
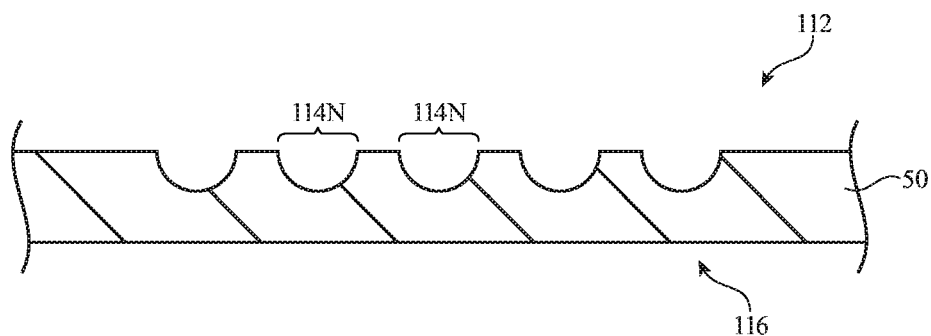
FIG. 10 is a cross-sectional side view of an illustrative microlens array layer having an upper surface with concave microlenses in accordance with an embodiment.
Figure 11:
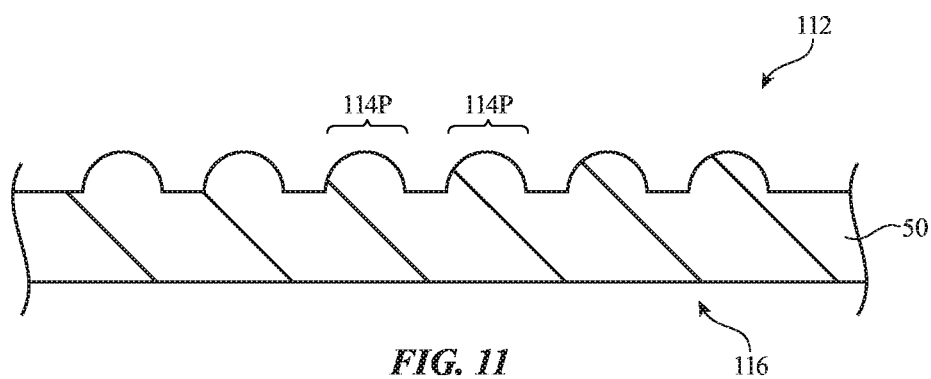
FIG. 11 is a cross-sectional side view of an illustrative microlens array layer having an upper surface with convex microlenses in accordance with an embodiment.
Figure 12:
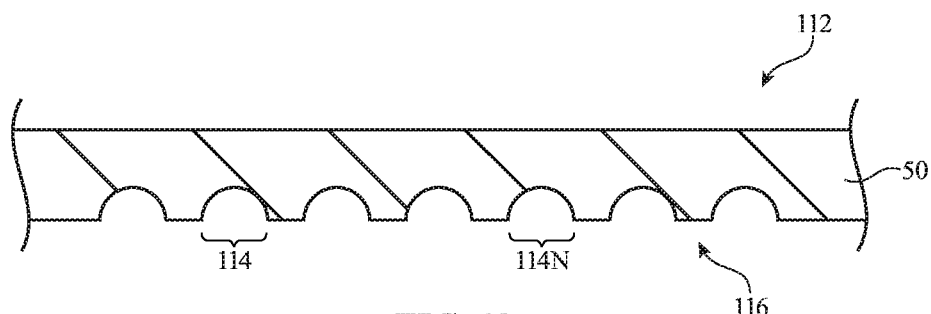
FIG. 12 is a cross-sectional side view of an illustrative microlens array layer having a lower surface with concave microlenses in accordance with an embodiment.
Figure 13:
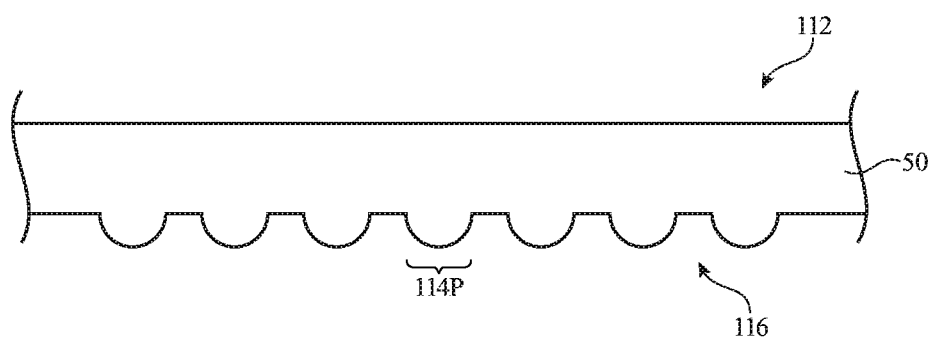
FIG. 13 is a cross-sectional side view of an illustrative microlens array layer having a lower surface with convex microlenses in accordance with an embodiment.

There are many possible arrangements for the microlens array layer to provide the microlens array layer with portions with different transmission and reflection percentages. Microlens array layers may include different types of microlens structures (sometimes referred to as light redirecting structures, light redirecting features, or lenses) as shown in FIGS. 10-13. In the example of FIG. 10, upper (outwardly facing) surface 112 of layer 50 has an array of concave lenses such as concave microlenses 114N (sometimes referred to as negative structures) and lower surface 116 is planar (e.g., no microlenses are formed on the lower surface). In the example of FIG. 11, upper surface 112 has convex microlenses 114P (sometimes referred to as a positive structures) and lower surface 116 is planar. As shown in FIG. 12, layer 50 may, if desired, have a planar upper surface 112 (e.g., no microlenses are formed on the upper surface) and a lower surface 116 with an array of concave microlenses 114N. In yet another embodiment, shown in FIG. 13, microlens array layer 50 may have a planar upper surface 112 and a lower surface 116 with an array of convex microlenses 114P.

Any combination of the features shown in FIGS. 10-13 may be formed in a single microlens array layer. For example, microlenses (either concave or convex) may be formed on both the upper surface and the lower surface of the microlens array layer. Different types of microlenses may also be formed in a single microlens array layer. For example, a single surface may have both convex and concave microlenses or a first surface may have convex microlenses and a second surface may have concave microlenses.

Microlenses 114 may have lateral dimensions of about 15-25 microns, at least 1 micron, at least 2 microns, at least 4 microns, at least 7 microns at least 10 microns, at least 20 microns, at least 40 microns, at least 100 microns, less than 300 microns, less than 150 microns, less than 75 microns, less than 30 microns, less than 15 microns, less than 5 microns, or other suitable lateral (X-Y plane) dimensions and may have heights of about 3-20 microns, at least 0.5 microns, at least 1 micron, at least 2 microns, at least 5 microns, at least 25 microns, at least 100 microns, less than 250 microns, less than 125 microns, less than 60 microns, less than 30 microns, or other suitable heights.

A non-uniform pattern may be used for microlenses 114 to reduce Moiré effects and to enhance light uniformity. For example, the heights, diameters, and/or center locations of lenses 94 may be randomized (e.g., lenses 114 may have a random distribution of powers produced by varying the lens curvature and clear aperture for lenses 114, while configuring the array of lenses 94 to exhibit a desired average power). If desired, microlenses 114 may be configured to form an array of lenses of a desired periodicity (e.g., a desired pitch) but each lens in the array (e.g., the lens at each row and/or column of the array) may have a lens center position that is offset by a random (non-uniform) amount relative to its nominal position within the array. The magnitude of the random lens center offset (in one or both lateral dimensions of the array) may be 1-30% of the nominal lens-center-to-lens-center spacing (pitch) of the array, may be at least 5% of the nominal spacing, may be at least 10% of the nominal spacing, may be less than 90% of the nominal spacing, may be less than 20% of the nominal spacing, etc. With this type of arrangement, the lens center of each lens in the array may be offset from the periodic pitch of the array by an amount that differs from that of its neighboring lenses in the array. The microlens array layer has an array of lenses arranged in rows and columns, each of the lenses has a lens center that is offset from a nominal lens center position in the array by an offset value, and the offset values of the lenses are different in different rows and columns (e.g., the offset value for each lens differs from that of the lenses in neighboring rows and/or columns). The use of intentionally offset lens center locations and/or lens powers and/or other non-uniform attributes lenses 114 may help reduce frequency contrast (e.g., periodic hot spots from light-emitting diodes).

Microlens array layer 50 may include other desired light redirecting structures such as lenticular lenses (e.g., lenses with a concave or convex cross-section that extend along a longitudinal axis), prisms that extend along longitudinal axes (with any desired cross-sectional shape), pyramidal structures (either protruding from or recessed in an upper surface of the microlens array layer), etc.

Different types of microlens structures may transmit and reflect different amounts of light. For example, the convex microlenses 114P in FIG. 11 may transmit between 50% and 60% of light (and therefore reflect between 40% and 50% of light) that passes from the lower surface to the upper surface of the microlens array layer. The concave microlenses 114N in FIG. 10 may transmit between 80% and 90% of light (and therefore reflect between 10% and 20% of light) that passes from the lower surface to the upper surface of the microlens array layer. These different types of microlenses may therefore be used to form portions of microlens array layer 50 that transmit different amounts of light.

Figure 14:
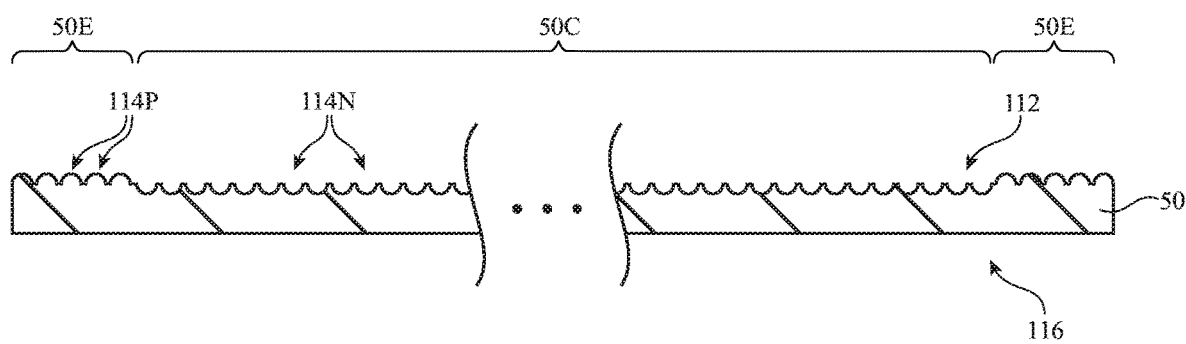
FIG. 14 is a cross-sectional side view of an illustrative microlens array layer having an upper surface with convex microlenses in an edge portion and concave microlenses in a central portion in accordance with an embodiment.

A cross-sectional side view of an illustrative microlens array layer with different portions that transmit different amounts of light is shown in FIG. 14. As shown in FIG. 14, the central portion 50C of the microlens array layer may include the concave microlenses 114N on upper surface 112. The edge portion 50E of the microlens array layer may include the convex microlenses 114P on upper surface 112. Lower surface 116 may be planar. This type of arrangement results in edge portion 50E of the microlens array layer transmitting less light than central portion 50C (because microlenses 114P reflect more light than microlenses 114N), mitigating the previously discussed blue edge effect.

In the embodiment of FIG. 14, microlens array layer 50 is depicted as transitioning from entirely convex microlenses in edge portion 50E to entirely concave microlenses in central portion 50C. However, this example, which results in the transmittance following a step function between the two microlens array portions, is merely illustrative. As previously discussed, in other embodiments there may be a gradual change in transmittance between the two portions of the microlens array. To form this gradual change in transmission of light, the relative density of a first structure (e.g., convex microlenses 114P) relative to a second structure (e.g., concave microlens 114N) may change gradually between the two portions of the microlens array layer. Alternatively, the shape of the structure may gradually change between a first structure with a first transmission percentage and a second structure with a second transmission percentage.

Figure 15:
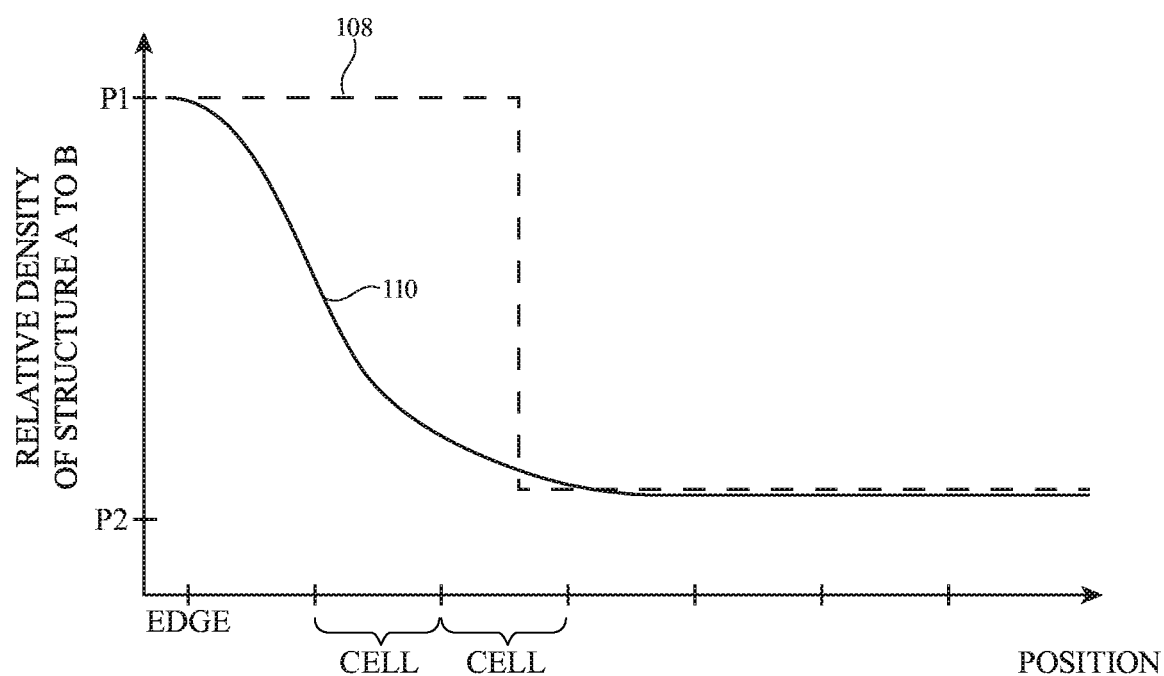
FIG. 15 is a graph illustrating how the relative density of light redirecting structures may follow a curved profile in accordance with an embodiment.

FIG. 15 is a graph of the relative density of light redirecting structures (e.g., microlenses) in a microlens array layer as a function of position within the microlens array layer. For example, structure A may be a convex microlens 114P as shown in FIGS. 11 and 14 whereas structure B may be a concave microlens 114N as shown in FIGS. 10 and 14. At the edge of the microlens array, the relative density of structure A to structure B (e.g., percentage of microlenses within a given unit area that are convex microlenses) is at a first value P1. Profile 108 shows a profile of relative density in an embodiment where the profile follows a step function (as in FIG. 14). A first value P1 (e.g., 100% in FIG. 14) of the structures in edge portion 50E are convex microlenses. At the border between edge portion 50E and central portion 50C, the relative density may drop to P2 (e.g., 0% in FIG. 14). Curve 110 shows an alternate embodiment where the relative density gradually changes from P1 to P2. Curve 110 may have the same shape as curve 104 in FIG. 6, if desired. In this embodiment, the relative density may be dependent upon (e.g., proportional to) the distance to the edge of the microlens array layer.

Varying the density of two structures that transmit different percentages of light in different portions of the microlens array layer is merely one way to form the microlens array layer with the desired transmittance profile. In another embodiment, the geometry of the microlenses may gradually change as the microlenses move further from the edge of the microlens array layer. For example, the height (or a lateral dimension) of the microlenses may gradually change as the microlenses move further from the edge of the microlens array (e.g., the height may have a profile with a similar shape to profile 110 in FIG. 15). This gradual change in shape of the microlenses across the boundary between the first and second transmittance portions of the microlens array layer may ensure color uniformity of the light from the backlight.

The transmittance may be reduced even more in the corner of the microlens array layer than in the edges of the microlens array layer. The transmittance profile in the corner of the microlens array layer may not be symmetrical and may depend on the aspect ratio of the display, in one example.

Whether changing the relative density between two structures or gradually changing the geometry of a structure to control the transmittance profile, any desired type of light redirecting structure may be used. For example, any of the microlenses shown in FIGS. 10-13 may be used (e.g., concave and/or convex microlenses on the top and/or bottom surfaces of the microlens array layer). Other desired light redirecting structures such as lenticular lenses (e.g., lenses with a concave or convex cross-section that extend along a longitudinal axis), prisms that extend along longitudinal axes (with any desired cross-sectional shape), pyramidal structures (either protruding from or recessed in an upper surface of the microlens array layer), etc. may be used to control the transmittance profile of the microlens array layer.

Figure 16:
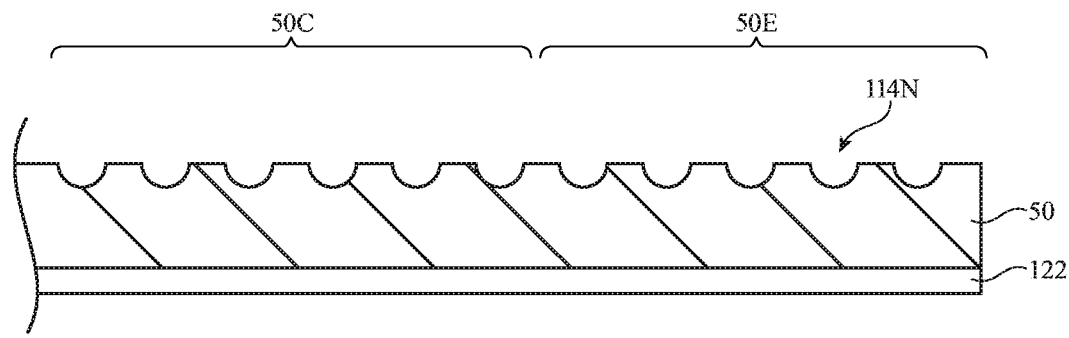
FIG. 16 is a cross-sectional side view of an illustrative microlens array layer having a coating in accordance with an embodiment.

The example of using the light redirecting structures (e.g., microlenses) to control the transmittance profile of the microlens array layer is merely illustrative. If desired, a coating may be formed on a lower surface of the microlens array layer that helps control how much light passes through the microlens array layer. FIG. 16 is a cross-sectional side view of an illustrative microlens array layer having a coating 122. Coating 122 may be formed on the lower surface of microlens array layer 50. Microlens array layer 50 may be formed from a transparent layer with microlenses 114N formed on upper surface 112. In some cases, the coating and the transparent layer with the microlenses may collectively be referred to as a microlens array layer.

Figure 17:
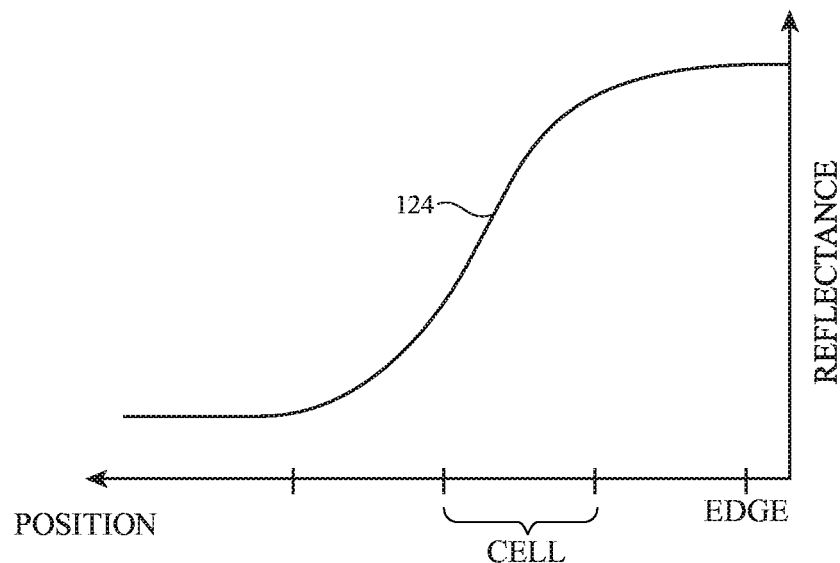
FIG. 17 is a graph illustrating the reflectivity profile for a coating on a microlens array layer in accordance with an embodiment.

In FIG. 16, concave microlenses 114N are formed across the entire microlens array layer. Therefore, to increase the reflection of the microlens array layer in the edge of the microlens array layer, coating 122 may be a reflective coating that reflects more light in edge portion 50E of the microlens array layer than in central portion 50C of the microlens array layer. FIG. 17 shows an illustrative reflectance profile 124 for coating 122 that may be used to achieve the desired microlens array layer transmission profile. The desired reflectivity for coating 122 may be achieved using any desired materials or methods. Coating 122 may be formed from any desired reflective material. Coating 122 may instead be a diffusive coating with a diffusion profile, if desired.

Figure 18:
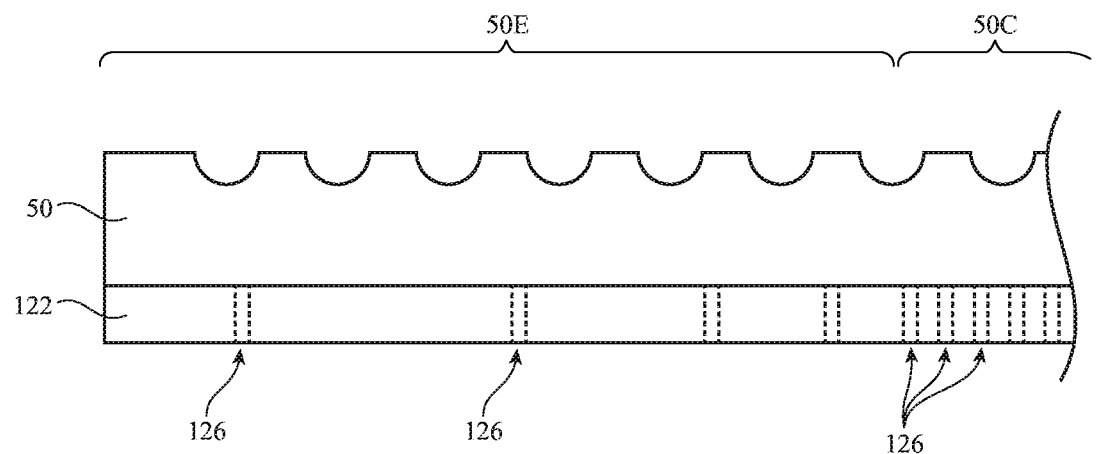
FIG. 18 is a cross-sectional side view of an illustrative microlens array layer having a coating with perforations in accordance with an embodiment.

FIG. 18 shows another embodiment in which coating 122 has a plurality of perforations to control the amount of light transmitted through the microlens array layer. As shown, coating 122 may have perforations 126 (sometimes referred to as openings 126) that pass from an upper surface of the coating to a lower surface of the coating. As shown in FIG. 18, there may be less (e.g., a lower density of) perforations in the edge region of the microlens array layer than in the central region of the microlens array layer to achieve a desired transmission profile. Coating 122 may be a white or reflective coating. Each perforation may have at least one dimension that is less than 100 microns (or less than 10 microns, less than 1 micron, less than 0.1 micron, etc.). Therefore the perforations may sometimes be referred to as microperforations.

Coating 122 in FIGS. 16 and 18 may be attached to the lower surface of microlens array layer 50 in any desired manner. In one example, a layer of adhesive may be interposed between the coating and the lower surface of the microlens array layer to attach the coating to the microlens array layer. In another example, the coating may be laminated or deposited directly on the lower surface of the microlens array.

Additionally, the examples of coating 122 being part of the microlens array layer are merely illustrative. If desired, coating 122 may be formed as a separate film than the microlens array or may be attached to another layer within the display.

The examples of colors of light described herein (e.g., light-emitting diodes that emit blue light and a phosphor layer that convers the blue light to white light) are merely illustrative. A microlens array layer having different transmittance portions may be used in a variety of backlights (regardless of the specific colors used in the backlight). In the examples herein, microlens array layer 50 was described as being used in a two-dimensional backlight arrangement in which light-emitting diodes emit light vertically through the display. However, the microlens array layer having different transmittance portions may also be used in edge-lit backlight units where light-emitting diodes emit light into an edge surface of a light guide plate. The light guide plate then distributes the emitted light laterally across the display to serve as backlight illumination. The microlens array layer may be formed over the light guide plate in this embodiment.

The foregoing is merely illustrative and various modifications can be made to the described embodiments. The foregoing embodiments may be implemented individually or in any combination.

What is claimed is:

1. A display, comprising:
   an array of pixels; and
   a backlight configured to produce backlight illumination for the array of pixels, wherein the backlight comprises:
      a two-dimensional array of light-emitting diode cells each of which includes at least one light-emitting diode that is configured to emit light;
      a color conversion layer formed over the two-dimensional array of light-emitting diode cells; and
      a microlens array layer formed over the color conversion layer, wherein the microlens array layer has a central portion and an edge portion that surrounds the central portion, wherein the central portion has a first transmittance, and wherein the edge portion has a second transmittance that is different than the first transmittance.

2. The display defined in claim 1, wherein the light-emitting diodes in the two-dimensional array of light-emitting diode cells emit blue light and wherein the color conversion layer comprises a phosphor layer that converts the blue light from the light-emitting diodes to white light.

3. The display defined in claim 2, wherein the backlight further comprises:
   a dichroic filter interposed between the two-dimensional array of light-emitting diode cells and the color conversion layer.

4. The display defined in claim 1, wherein the first transmittance is higher than the second transmittance.

5. The display defined in claim 1, wherein the central portion of the microlens array layer comprises at least a first microlens having a first shape, wherein the edge portion of the microlens array layer comprises at least a second microlens having a second shape, and wherein the first and second shapes are different.

6. The display defined in claim 5, wherein the microlens array layer comprises a plurality of microlenses with shapes that gradually change from the first shape to the second shape.

7. The display defined in claim 1, wherein the central portion of the microlens array layer comprises a plurality of concave microlenses and wherein the edge portion of the microlens array layer comprises a plurality of convex microlenses.

8. The display defined in claim 1, wherein the central portion of the microlens array layer comprises a plurality of first light redirecting structures each having a first shape and wherein the edge portion of the microlens array layer comprises a plurality of second light redirecting structures each having a second shape that is different than the first shape.

9. The display defined in claim 8, wherein the central portion of the microlens array layer only includes the first light redirecting structures and wherein the edge portion of the microlens array layer only includes the second light redirecting structures.

10. The display defined in claim 8, wherein a relative density of the first light redirecting structures relative to the second light redirecting structures follows a curved profile at a boundary between the central portion and the edge portion of the microlens array layer.

11. The display defined in claim 1, wherein the microlens array layer comprises a layer with a plurality of microlenses and a coating on a lower surface of the layer with the plurality of microlenses.

12. The display defined in claim 11, wherein the coating is a reflective coating with a reflectance gradient between the central portion and the edge portion of the microlens array layer.

13. The display defined in claim 11, wherein the coating comprises a plurality of perforations and wherein a density of perforations is higher in the central portion of the microlens array layer than the edge portion.

14. A display, comprising:
an array of pixels; and
a backlight configured to produce backlight illumination for the array of pixels, wherein the backlight comprises:
 a plurality of light-emitting diodes that are configured to emit light;
 a microlens array layer that is configured to spread the light from the plurality of light-emitting diodes, wherein the microlens array layer has an edge portion and a central portion, wherein the edge portion extends around a periphery of the microlens array layer and surrounds the central portion, and wherein the central portion has a higher transmittance than the edge portion.

15. The display defined in claim 14, wherein the backlight further comprises:
 a color conversion layer configured to convert the light from the plurality of light-emitting diodes from a first color to a second color.

16. The display defined in claim 15, wherein the backlight further comprises:
 a dichroic filter, wherein the color conversion layer is interposed between the dichroic filter and the microlens array layer; and
 a plurality of optical films formed over the microlens array layer.

17. The display defined in claim 14, wherein the edge portion of the microlens array layer comprises a plurality of convex microlenses and the central portion of the microlens array layer comprises a plurality of concave microlenses.

18. The display defined in claim 17, wherein a relative density of convex microlenses follows a gradient that decreases based on a distance to an edge of the microlens array layer.

19. A display, comprising:
an array of pixels; and
a backlight configured to produce backlight illumination for the array of pixels, wherein the backlight comprises:
 a two-dimensional array of light-emitting diodes;
 a dichroic filter formed over the two-dimensional array of light-emitting diodes;
 a color conversion layer formed over the dichroic filter; and
 a microlens array layer formed over the color conversion layer, wherein the microlens array layer has an upper surface, wherein a first portion of the upper surface has a plurality of concave microlenses, wherein a second portion of the upper surface has a plurality of convex microlenses, and wherein a relative density of the plurality of convex microlenses follows a gradient that decreases based on a distance to an edge of the microlens array layer.

* * * * *